United States Patent [19]
Stewart et al.

[11] Patent Number: 5,471,674
[45] Date of Patent: Nov. 28, 1995

[54] COMPUTER SYSTEM WITH PLUG-IN OVERRIDE OF SYSTEM ROM

[75] Inventors: Gregory N. Stewart; Anthony L. Overfield, both of Austin; Mark T. Ellis, Cedar Park, all of Tex.

[73] Assignee: Dell USA, L.P., Austin, Tex.

[21] Appl. No.: 197,110

[22] Filed: Feb. 16, 1994

Related U.S. Application Data

[63] Continuation of Ser. No. 831,218, Feb. 7, 1992, abandoned.

[51] Int. Cl.$^6$ .................................................. G06F 9/445
[52] U.S. Cl. ........................... 395/650; 395/442; 395/833; 364/231.1; 364/280.2; 364/DIG. 1
[58] Field of Search ............................. 395/325, 700, 395/275, 725

[56] References Cited

U.S. PATENT DOCUMENTS

| | | | |
|---|---|---|---|
| 3,944,984 | 3/1976 | Morley et al. | 395/425 |
| 4,141,068 | 2/1979 | Mager et al. | 395/425 |
| 4,430,704 | 2/1984 | Page et al. | 395/700 |
| 4,589,063 | 5/1986 | Shah et al. | 395/275 |
| 4,590,557 | 5/1986 | Lillie | 395/700 |
| 4,663,707 | 5/1987 | Dawson | 395/700 |
| 4,720,812 | 1/1988 | Kao et al. | 395/700 |
| 4,760,406 | 7/1988 | Sato et al. | 346/33 R |
| 4,791,564 | 12/1988 | Takai | 395/425 |
| 5,053,797 | 10/1991 | Samuels et al. | 354/322 |
| 5,056,001 | 10/1991 | Sexton | 395/275 |
| 5,101,490 | 3/1992 | Getson, Jr. et al. | 395/425 |
| 5,113,369 | 5/1992 | Kinoshita | 395/325 |
| 5,132,716 | 7/1992 | Samuels et al. | 354/322 |
| 5,136,713 | 8/1992 | Bealkowski et al. | 395/700 |
| 5,155,833 | 10/1992 | Cullison et al. | 395/425 |
| 5,274,816 | 12/1993 | Oka | 395/700 |
| 5,276,839 | 1/1994 | Robb et al. | 395/425 |
| 5,361,343 | 11/1994 | Kosonocky et al. | 395/425 |

*Primary Examiner*—Jack B. Harvey
*Assistant Examiner*—Glenn A. Auve
*Attorney, Agent, or Firm*—James Huffman; Stephen Terrile

[57] ABSTRACT

A portable computer system with a special connector, on the motherboard, into which a field-installable boot card can be inserted. The special motherboard connector is wired so that the operator, by setting connections on the field-installable boot card, can bypass the boot memory on the motherboard and force the computer to boot from the memory on the boot card. This permits a technician, in the field, to temporarily override the internal nonvolatile memory which holds the basic system software. This permits recovery of a system in which the basic system software has been corrupted. Preferably the motherboard boot memory is a flash EPROM, and can be rewritten, by setting appropriate jumpers on the boot card, after the computer has booted from the boot card. The motherboard connector is preferably located on the motherboard, and is accessible through a removable cover. This connector can also preferably be used for temporary attachment of a diagnostic display card.

29 Claims, 11 Drawing Sheets

COMPUTER SYSTEM WITH PLUG-IN OVERRIDE OF SYSTEM ROM

This application is a continuation of U.S. Ser. No. 07/831,218, filed Feb. 7, 1992, now abandoned.

PARTIAL WAIVER OF COPYRIGHT

All of the material in this patent application is subject to copyright protection under the copyright laws of the United States and of other countries. As of the first effective filing date of the present application, this material is protected as unpublished material.

Portions of the material in the specification and drawings of this patent application are also subject to protection under the maskwork registration laws of the United States and of other countries.

However, permission to copy this material is hereby granted to the extent that the owner of the copyright and maskwork rights has no objection to the facsimile reproduction by anyone of the patent document or patent disclosure, as it appears in the United States Patent and Trademark Office patent file or records, but otherwise reserves all copyright and maskwork rights whatsoever.

CROSS-REFERENCE TO OTHER APPLICATIONS

The following application of common assignee contains at least some drawings in common with the present application, and is believed to have an effective filing date identical with that of the present application, and is hereby incorporated by reference: Ser. No. 07/834,122, filed Feb. 7, 1992, entitled "Portable Computer with Plug-in Diagnostic Display Capability" (DSC-250).

BACKGROUND AND SUMMARY OF THE INVENTION

The present application relates to portable computer systems.

The innovations disclosed in the present application provide computer systems (especially very small portable personal computers) which have advantageous new capabilities for update and/or restoration of system software. To better explain the significance and advantages of these innovations, the following paragraphs will review some technological context. This technological context is not necessarily prior art, but is intended to help in pointing out the disclosed inventions.

Laptop and Smaller Computers

Portable personal computers were introduced in the early 1980s, and proved to be very useful and popular. As this market has developed, it has become increasingly clear that users strongly desire systems to have small volume, small weight, physical durability, and long battery-powered lifetime. Thus, small portable computers ("laptop" computers) have proven extremely popular during the late 1980s. Users continue to demand more features, longer time between recharges, and lower weight and volume. This combination of demands is difficult to meet. Moreover, in about 1990, another smaller generation of portable computers, referred to as "notebook" computers, began to appear; and even smaller computers are now appearing. These smaller form factors have only exacerbated the difficulty of the above tradeoffs.

As small portable computers have developed, the quality of the keyboard input has declined. The quantities of mass storage available on portables have steadily increased, but the cost per byte of the necessary ruggedized drives continues to be far above that of that of the drives normally used. This disparity seems likely to continue. Similarly, although some small portables use nonvolatized solid-state memory to replace disk drives, the cost per byte of such nonvolatized memory is likely to continue to exceed that of conventional mass storage devices.

As small portable computers become ever more common, an increasing number of users prefer to use two computers: one for their desktop, and one more fur the road.

One problem which arises is loss of file coherency: when a user edits a file on his secondary machine, he must transfer that file back to his primary machine before he again edits the same file on the primary machine.

A closely related problem is one of backup: portable computers are inherently more susceptible than desktop computers to accident, loss, and theft.

Laptops normally have a severely limited set of external ports. This limitation is imposed by several factors: first, each external connector takes up precious square inches of surface area. Second, each external connector is a point of vulnerability to electrostatic-discharge-induced component failure. Third, each external connector is a possible point of entry for dirt and moisture. Fourth, in calculating the worst-case power budget for a system, the possible power required by all connectors must be considered.

Layers of Software and Firmware Structure

In order to mediate between application programs and the underlying hardware, several layers of software and firmware structure are used. To better show the context of the invention, these layers will be described below in greater detail.

Startup Software (POST, Bootstrap, etc.)

A computer system normally includes a number of complex hardware components (chips and subsystems). When power is first applied to a computer (or when the user triggers a reset after the system has locked up), the various hardware elements (chips and subsystems) will each have their own internal procedures (reset procedures) to regain a stable and known state. However, at some point (if the hardware is intact), these reset procedures will have ended, and at this point the CPU performs various important overhead tasks under software control. This phase of operation is generally referred to as "POST" (Power-On-Self-Test).

After POST, a "bootstrap" program is run, to permit the CPU to begin execution of other software. For robustness, the POST and bootstrap software is normally stored in a read-only memory. The bootstrap program launches the CPU on execution of the primary operating system software; the primary operating system can then be used by the user to launch an application program, either manually or automatically.

Bootstrap Programs

Any computer system must have some way to begin program execution after a cold start. The hardware architecture of a microprocessor (or other CPU) will normally provide for a "reset" operation, which places all of the hardware circuits in a known electrical state; but it is still necessary to start the CPU on execution of a desired program. For example, in the very early days of computing, some computer systems would be manually configured to read in a "bootstrap loader" program at startup. This bootstrap program was a simple program which loaded in, and started execution of, another sequence of instructions, which were the beginning of the desired program. Bootstrap programs are often referred to simply as "boot" software.

To give a more recent example, the Intel 80×86 microprocessors, after a hardware reset, will always attempt to begin program execution from a specific memory address. Thus, if a branch (or conditional branch) instruction is found at this address, the microprocessor will continue its program execution from whatever address is specified.

Thus, this initial target address is the entry point for every session of use. This address is normally used to enter execution of programs which must be run every time the computer is used.

"Basic Input/Output System" Software (BIOS)

The "basic input/output system" (BIOS) software contains frequently-used routines for interfacing to key peripherals, for interrupt handling, and so forth. For system robustness, the BIOS software itself is normally packaged in nonvolatile memory with other key pieces of overhead software, such as POST, boot, and configuration management routines, as well as a pointer to launch the computer into the operating system software. (Thus, the term "BIOS" is often used more broadly, to refer to this whole collection of basic system routines in ROM or EPROM.)

In many types of modern personal computers (and in all "IBM-compatible" personal computers), a key part of the system software is a "basic input/output system" (BIOS) program. The BIOS program contains frequently-used routines tier interfacing to key peripherals, for interrupt handling, and so forth.

For system robustness, the BIOS software is normally packaged in a read-only-memory. In fact, it is normally packaged together with the startup software mentioned above. Thus, nowadays the term "BIOS" is often used, somewhat more broadly, to refer to this whole collection of basic system routines.

BIOS Upgrades

If the BIOS software were to become corrupted, the computer could become unusable. Thus, the BIOS software has conventionally been stored in read-only memory (ROM). When the microprocessor attempts to access the initial target address, it reads out software from the BIOS ROM.

In 1980 there was only one source for IBM-compatible BIOS software, and that was from IBM. However, during the 1980s, as IBM-compatible personal computers became more popular, modified versions of IBM-compatible BIOS ROMs were developed, and IBM-compatible BIOS ROMs were offered by multiple vendors. As of 1991, BIOS software is often modified to implement system-dependent features, especially in low-power systems.

Improvements in BIOS software mean that sometimes it will be desirable to implement a BIOS upgrade. Dedicated users have successfully pried out and replaced ROM chips, but most users would not want this degree of hands-on contact.

Some attempts have been made in the past to provide capability for updating the basic system software. See, e.g., Bingham, D. B., "Achieving flexible firmware," 1978 MIDCON Technical Papers at 20/3/1–4 (1978), which is hereby incorporated by reference.

Rewritable BIOS in Flash EPROM

Commonly-owned patent application 706,750, filed May 29, 1991 and entitled "Computer System with Restorable Basic Firmware" (DC-200), which is hereby incorporated by reference, disclosed a computer system in which the basic system software can be electrically rewritten. This system uses an electrically-erasable EPROM, and provides some significant safeguards against data corruption.

Customized BIOS and BIOS Extensions

The BIOS in IBM-compatible computers is accessed by interrupts, but the vectors for those interrupts can be diverted to other addresses Coy overwriting an address pointer in system RAM). This capability significantly expands the flexibility of the BIOS, and programmers use it very frequently.

However, while the capability to divert BIOS vectors is useful, it is not sufficient to address many needs. Changes to the interrupt-handling vectors will not affect other portions of the BIOS. Computer designers have found it highly desirable to prepare (or obtain) customized BIOS routines to fully exploit the advantage of their systems. For example, such customized BIOS routines are commonly necessary in very-low-power portable systems, to implement power-saving features which maximize battery lifetime. BIOS customization has increasingly been recognized as an important element in rapidly developing a reliable advanced system.

Operating System Software

The application software will normally interface to an operating system (such as DOS, DOS+Windows, OS/2, UNIX of various flavors, or UNIX plus X-windows). The operating system is a background software program which provides an application programming interface (API) for use by the application software. Thus, the programmers writing application software can write their software to fit the API, rather than having to find out and fit the peculiarities of each particular machine.

Diagnostics and Utility Programs

In recent years, many personal computer manufacturers have expanded their product lines. This has dramatically increased the difficulty of supporting an entire product line in terms of the standard software products that a manufacturer may choose to include or sell with its computers.

Examples are diagnostic programs, operating system software and utility software. It is increasingly necessary to provide a means for such software to identify the individual machines and their unique features, without having to be rewritten each time a new product is introduced.

Furthermore, it may be difficult or undesirable to implement even similar features in exactly the same way, since each design has different constraints in terms of cost and each will incorporate the knowledge gained by building the previous product. The problem gets worse as a product line ages. It is desirable to continue to support older products with newer versions of software, and it is also desirable for older versions of software to run unmodified on newer platforms. One solution to this problem is to write tile software to the common subset of functions supported by all platforms. However, this does not allow the manufacturer to differentiate his product from the competition. Consequently, it is desirable for each individual machine to have the capability to identify its own unique feature set to such software, while at the same time providing the individualized means for carrying out those functions.

The Need for Robust Diagnostic Procedures

Like all complex systems, computers sometimes fail. Since so many independent software and hardware elements are interrelated, the failure modes can be quite complex.

Normally, the internal state of a computer is not directly perceptible, but is translated into an externally perceptible state by a properly functioning system. However, when a major malfunction occurs, the externally visible state of the machine may cease to reflect the internal state. A well-designed computer architecture should provide robust low-level diagnostic signals, so that major faults can be traced.

For example, in common "IBM-compatible" machines, the POST code will not only write to the display, but will also produce audible signals and noises by which an experienced user (or technician) can roughly gauge the machine's progress through the boot process. Most machines also have LEDs which can be driven selectively, under software control, to provide some minimal amount of diagnostic information.

Some tower-configuration personal computers shipped by Dell™ Computer have included a 4-character LCD display, to provide a robust diagnostic display even if the normal display was disabled for any reason.

Computer with Temporary Override of Nonvolatile Boot Memory

The present application discloses a computer system with a special connector into which a field-installable boot card can be inserted, to override the internal nonvolatile boot memory which holds the basic system software. The special connector includes all control signals for the boot memory, as well as the relevant address lines which are used by the CPU to read the boot memory. Moreover, the motherboard is wired, in a special hardware relationship, so that the connections on the field-installable boot card can disable the boot memory on the motherboard, and force the computer to boot from the memory on the boot card. This permits a technician, in the field, to temporarily override the internal nonvolatile memory which holds the basic system software. This permits recovery of a system in which the basic system software has been corrupted.

Preferably the motherboard boot memory is a flash EPROM, and can be rewritten, by setting appropriate jumpers on the boot card, after the computer has booted from the boot card. This permits easy restoration of a system in which the basic system software has been corrupted.

The special connector is preferably located on the motherboard, separately from the normal I/O connectors, and is accessible through a removable cover.

In the presently preferred embodiment, this special connector can also preferably be used for temporary attachment of a diagnostic display card.

Booting and Running from the Boot Card

Once the boot card is inserted into the special connector, the computer can be rebooted (e.g. by turning its power off and on). With jumper on the boot card in its first position, the motherboard boot memory will be disabled (due to the signal on line ROMDISABLE), and the boot memory on the boot card will respond to all attempted accesses to the motherboard boot ROM.

Typically the boot memory on tile boot card is used simply to store an updated copy of the same software (POST, boot, and system software) which is normally stored in the motherboard boot memory. Thus, when the computer is restarted with the boot card attached, it will boot normally. As part of the boot process, tile computer copy the contents of the boot memory into system RAM.

Restoring the Motherboard Boot Memory

Preferably the main boot memory is a rewritable nonvolatile memory (such as a flash EEPROM). Thus, even if the data in the main boot memory is corrupt, it can be rewritten. After the computer has been booted from the boot card, a programmation routine can be launched to rewrite the motherboard (flash EEPROM) boot memory from the boot memory copy in system RAM. (Note that this requires disabling the boot card's boot memory, so that the address space in the main boot memory is again made accessible.) For block erasure and reprogrammation of the flash memory, a high voltage is necessary. The presently preferred embodiment uses a DC-DC converter to generate a 12 Volt level for this.

Computer Adapted for Temporary Diagnostic Display

The special motherboard connector, in the presently preferred embodiment, can also be used for insertion of a diagnostic module, which provides a visible diagnostic output. This connector is preferably located, separately from the normal I/O connectors, on the motherboard, and is accessible through an easily removable cover.

In the small portable computer system of the presently preferred embodiment, the diagnostic display card includes a 4-character LED display which can be driven by BIOS routines. This card can be stacked with a removable field-installable BIOS card in the same motherboard connector. Thus, without requiring any additional external connectors on the exterior, this portable computer system includes the capability for extremely robust diagnostic procedures, which can be used despite failure of the display.

This invention is believed to be particularly useful in small portable computers, where space is at a premium. However, it should be noted that this invention can also be applied to larger computers.

Many types of test ports have been used in computers. In general, a test port contains enough lines to let a test equipment station exercise the system bus, and the primary components of the main system board, in order to ascertain where a fault has occurred. The special connector used in the presently preferred embodiment contains some features in common with prior test ports, but with a difference: the system software, in computers according to the disclosed invention, contain special code to output status codes, through the special connector, onto a diagnostic display if one is attached. The diagnostic display is NOT used in normal operation, and does not replace any part of the operation of the normal display: instead, the diagnostic display provides a robust diagnostic "scope" into the operation of the motherboard and the system software. This diagnostic view permits errors to be diagnosed even if the main display is absent, broken, or temporarily disabled by a system error condition.

Use of Special Connector for High-Speed Programmation of Nonvolatile

System-Software Memory

A contemplated alternative use of the motherboard connector slot is for high-speed programmation of the flash memory, during manufacturing. This capability is not used in the presently preferred embodiment, but can readily be implemented.

BRIEF DESCRIPTION OF THE DRAWING

The present invention will be described with reference to the accompanying drawings, which show important sample embodiments of the invention and which are incorporated in the specification hereof by reference, wherein:

FIGS. 2A-1, 2A-2, and 2A-3 are parts of a single Figure which shows the wiring of the preferred embodiment of the innovative boot-memory-bypass card disclosed herein.

FIGS. 3A-3E show the detailed structure.

DESCRIPTION OF THE PREFERRED EMBODIMENTS

The numerous innovative teachings of the present application will be described with particular reference to the presently preferred embodiment. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Overall Architecture

The presently preferred embodiment has been implemented on several different computer systems. The primary disclosed embodiment relates to the Dell 320N computer. This is a notebook computer, with an external closed size of about 8.5×11×2 inches.

Figure 4:
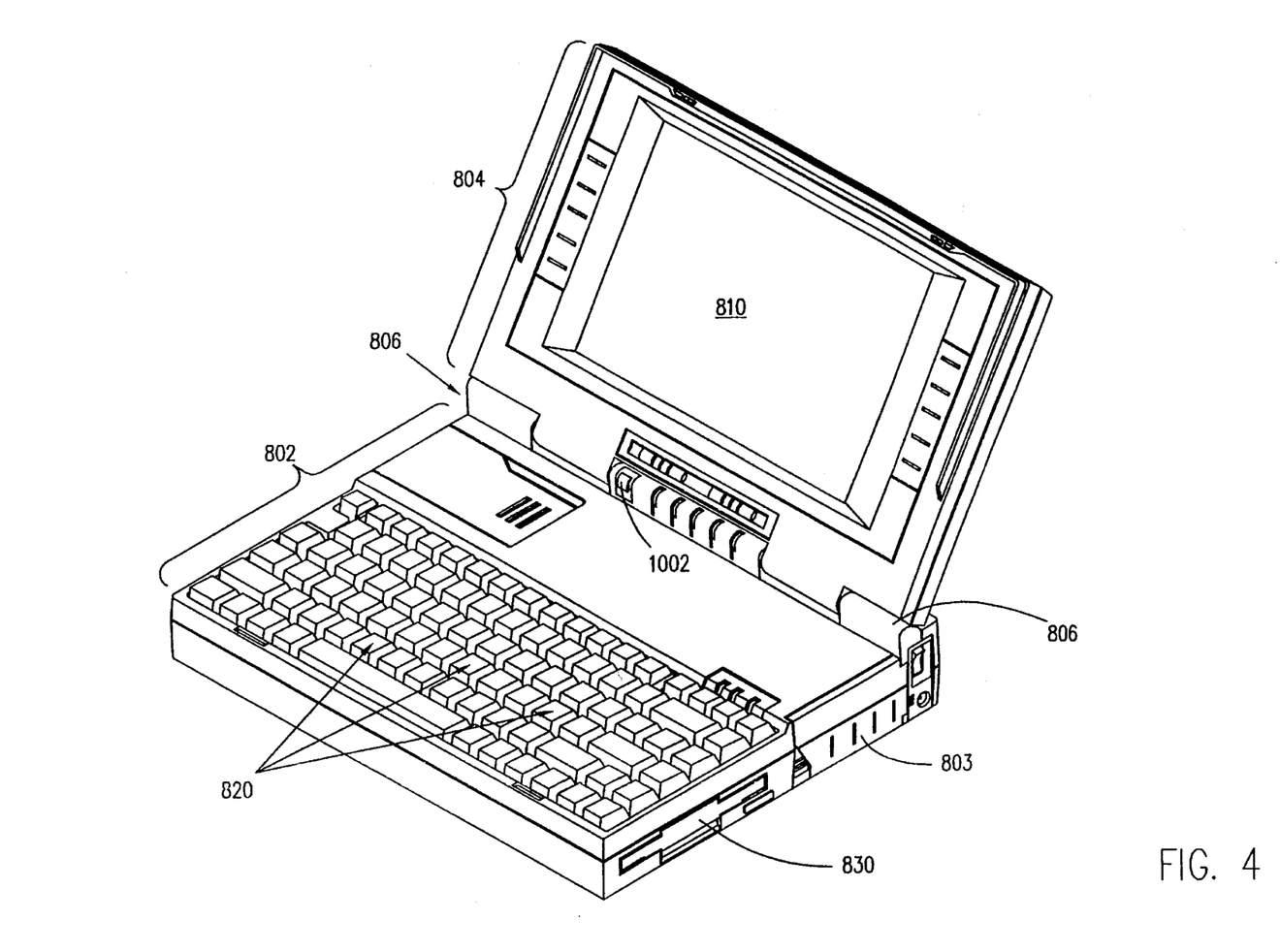
FIG. 4 shows the physical appearance, of the preferred embodiment of tile notebook computer disclosed herein.

FIG. 4 shows a perspective view of the notebook computer 100, of the presently preferred embodiment, in the open position. This computer is a notebook computer, which includes a compact keyboard and screen in a rugged plastic case with a battery power supply. Visible elements include case 802, cover 804, hinges 806, display screen 810, keyboard 820, floppy disk drive 830, and dust cover 803 (which covers the receptacle for the rechargeable battery pack).

This computer, in the presently preferred embodiment, is a Dell 320N™ notebook computer, containing an Intel 386SX processor running at 20 MHz. (Hardware details and options of this computer, in the presently preferred embodiment, are extensively described in readily available Dell product literature, which is hereby incorporated by reference.) However, this model is merely one example of the hardware environments in which the inventions have been demonstrated to work.

FIGS. 3A-3E show the detailed structure of the preferred hardware embodiment.

The microprocessor 300 is an Intel 386SX processor running at 20 MHz. (Hardware details and options of this computer, in the presently preferred embodiment, are extensively described in readily available Dell product literature, which is hereby incorporated by reference.) However, this model is merely one example of the hardware environments in which the inventions have been demonstrated to work.

In the presently preferred embodiment, an HT21 chip 310, from Headland Technologies, is used to provide a variety of peripheral support functions to the main microprocessor. These include bus management, memory management, interrupt control, and DMA control. Serial port management and keyboard interface, and other I/O management functions, are provided by a VTI 82C186 combination chip 350. Of course, other implementations of support logic and glue logic can be used if desired, within this well-known architecture.

FIGS. 3A-3E show the detailed structure of the preferred hardware embodiment.

This computer is a notebook computer, which includes a compact keyboard and screen in a ragged plastic case with a battery power supply.

Figure 3A:
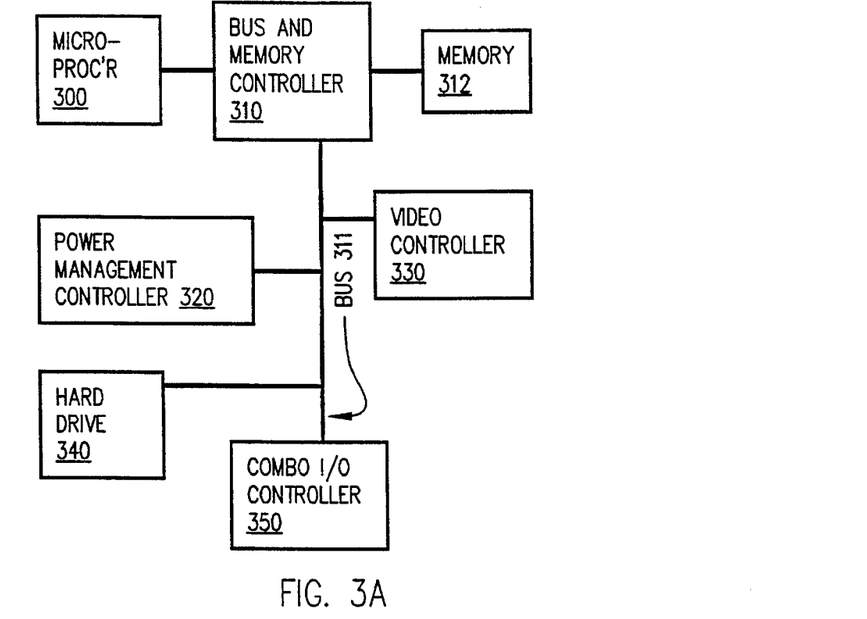

FIG. 3A gives an overview of the principal electronic components of hardware architecture.

Microprocessor 300, in the presently preferred embodiment, is a 386SX processor running at a 20 MHz clock rate. This microprocessor accesses bus 311, and memory 312, through controller 310. Bus and memory controller 310, in the presently preferred embodiment, is an HT21 chip from Headland Technologies. This chip provides a variety of peripheral support functions to the main microprocessor, including bus management, memory management, interrupt control, and DMA control.

Bus 311, in the presently preferred embodiment, is an ISA bus. Memory 312, in the presently preferred embodiment, is DRAM, as discussed below.

Figure 3B:
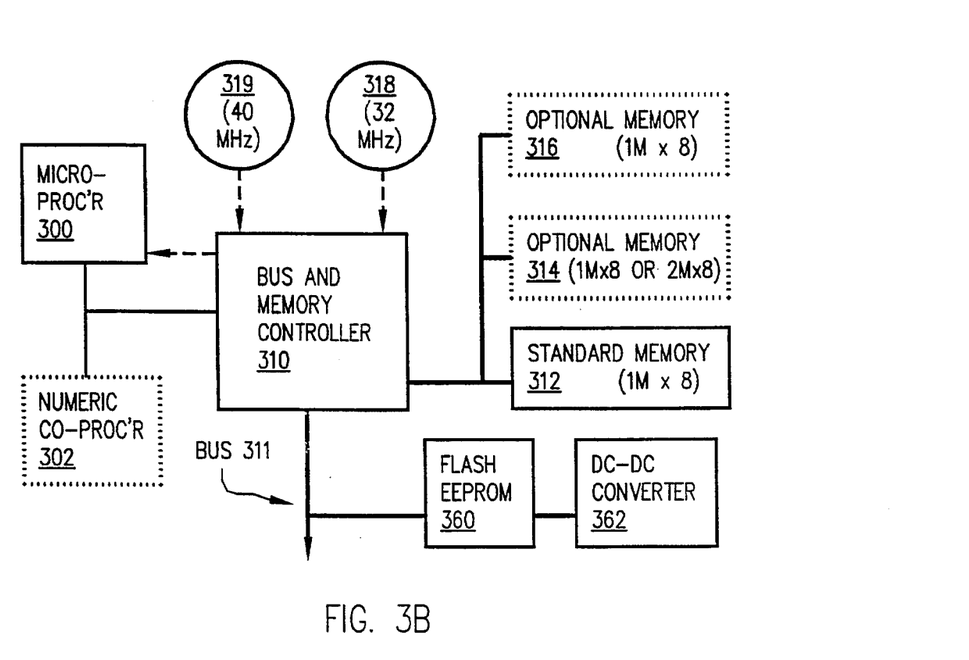
Figure 3C:
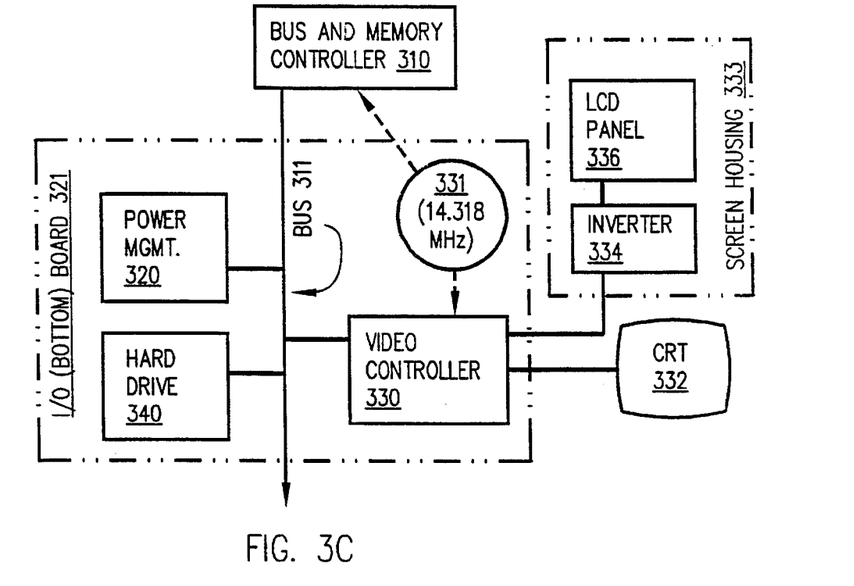

Video controller 330 is, in the presently preferred embodiment, a VGA chip, and is connected to additional components as shown in FIG. 3C below. This is implemented as a WD 90C20 VGA controller chip, in the presently preferred embodiment; but of course other components can optionally be used instead.

Figure 3D:
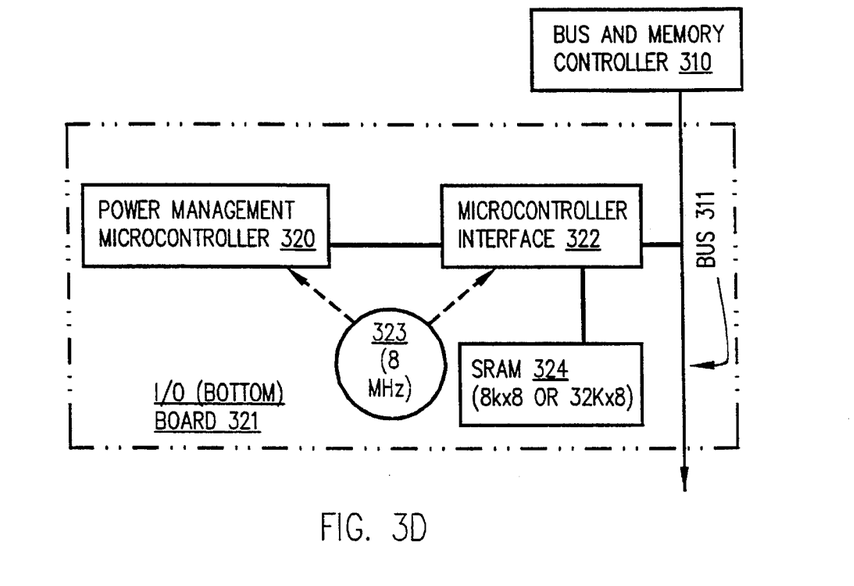

Power Management Controller 320 is a microcontroller, in the presently preferred embodiment, and is connected to additional components as shown in FIG. 3D below.

Hard disk drive 340, in the presently preferred embodiment, is a ruggedized 2½" IDE drive, such as the Conners Peripherals 242 40 MB 2.5" hard disk. (Other sizes are also available.)

Figure 3E:
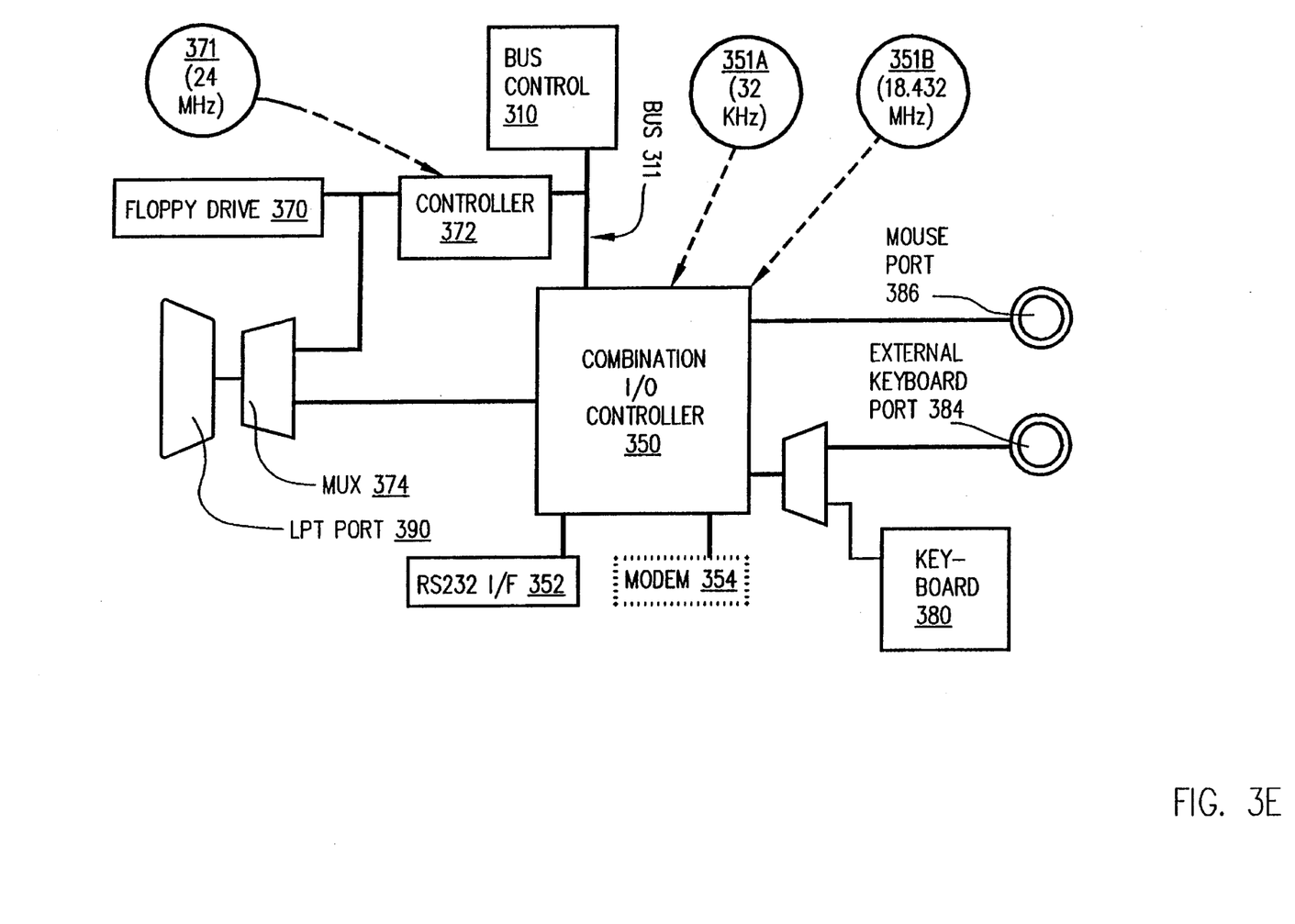

Serial port management and keyboard interface, and other I/O management functions, are provided, in the presently preferred embodiment, by a VTI 82C186 combination chip 350. (Of course, other implementations of support logic and glue logic can be used if desired, within this well-known architecture.) Combination I/O Controller 350 is connected to additional components as shown in FIG. 3E below.

FIG. 3B shows additional details of the connections of microprocessor 300 and bus controller 310. The microprocessor 300 is connected in parallel with a socket for an optional numeric co-processor 302 (e.g. a 387SX chip). Bus controller 310 receives two oscillator inputs. A 40 MHz crystal-controlled oscillator 319 provides a signal which is divided down to provide the clock for microprocessor 300. A 32 MHz crystal-controlled oscillator 318 provides a signal which is divided down to provide the clock for bus 311.

The standard component of memory 312 is one megabyte of DRAMs, 8 bits wide. Sockets are provided for optional expansion memory 314 (1M×8 or 2M×8), and for optional expansion memory 316 (2M×8). Both of these optional expansion memories are connected in parallel with memory 312 (except for slightly different address line connections).

Flash EEPROM 360 provides a rewritable boot memory. (The operation of this memory is described in detail in commonly owned application 707,121, filed May 29, 1991, entitled "Computer System with Restorable Basic Firmware" (DC-200), which is hereby incorporated by reference.)

When the flash memory 360 must be programmed, DC-DC converter 362 generates a 12-Volt programming voltage from the 5-Volt supply.

The hardware system of the presently preferred embodiment uses only three circuit boards for all components other than the power supply. The components shown in FIGS. 3B and 3E are included on a common circuit board. However, FIGS. 3C and 3D show components which are on an I/O (bottom) circuit board 321 or inside the screen housing 333.

FIG. 3C shows additional details of the connections of the video controller 330. A 14.318 MHz crystal-controlled oscillator 331 provides a reference frequency to video controller 330 and to bus controller 310. The video controller provides video output to inverter 334 and LCD display panel 336. (This is a Sharp VGA flat panel display, in the presently preferred embodiment, but of course other displays can be substituted.) A connection is also provided, in the presently preferred embodiment, for an external CRT monitor 332, which, if connected, can also be supplied with video signals from video controller 330.

FIG. 3D shows additional details of the connections of the power management microcontroller 320. In the presently preferred embodiment, this is a National Semiconductor COP888CF series microcontroller, which is connected to receive various inputs for power-monitoring. An ASIC 322 provides interface logic, including sequential logic, for interfacing the microcontroller 320 to the system bus 311. An 8 MHz crystal-controlled oscillator 323 provides a clock signal to microcontroller 320 and interface chip 322. An SRAM 324 (which may be 8K×8 or 32K×8) is also accessed through the interface chip 322. This provides local memory which the microcontroller 320 can use. U.S. patent application 07/655,889, filed Feb. 14, 1991 and entitled "Portable Computer with BIOS-independent Power Management" (DC-172), provides extensive detail concerning power management microcontroller 320 and ASIC 322. This application is hereby incorporated by reference.

FIG. 3E shows additional details of the connections of the combination I/O controller 350. This chip receives clock inputs from an 18.432 MHz crystal-controlled oscillator 351B, and from a 32 KHz crystal-controlled oscillator 351A. This chip, in the presently preferred embodiment, is a VTI 106; but of course a variety of other combination I/O management chips are available from Headland, Chips & Technologies, and other vendors, and other such chips can optionally be designed in.

I/O controller 350 is connected to receive input from mouse port 386.

I/O controller 350 is also connected to receive input from built-in keyboard 380, or from an external keyboard when one is plugged into external keyboard port 384.

I/O controller 350 is also connected to communicate with an internal modem 354, if one is installed.

I/O controller 350 is also connected to communicate, through RS232 interface 352, with a serial port connector (not shown).

I/O controller 350 is also connected to communicate, through multiplexer 374, with printer (parallel) port 390.

Note that multiplexer 374 also, in the presently preferred embodiment, permits the floppy disk controller 372 to send and receive floppy disk interface signals over the parallel port connector 390. This novel feature permits an external floppy drive to be connected to the printer port connector 390.

Floppy disk controller 372 interfaces to bus 311, and receives a clock signal from 24 MHz oscillator 371. Floppy disk controller 372 is a standard controller for a 3½" floppy disk drive 370, which, in the presently preferred embodiment, is an Epson 3.5" floppy disk drive unit.

The computer 100 also contains a conventional power supply circuitry (not shown), with connections for banks of rechargeable batteries. (Additional details of the power supply circuitry and battery connections are shown in application DC-172, referenced above, and hereby again incorporated by reference.)

Accessible Test Port Connector on Motherboard

There are two main boards in the computer system of the presently preferred embodiment, although only one of them is visible from outside. This board (the "top board") is easily accessible through the cover shown above the left side of the keyboard, between the keyboard and display, in FIG. 4.

Figure 1A:
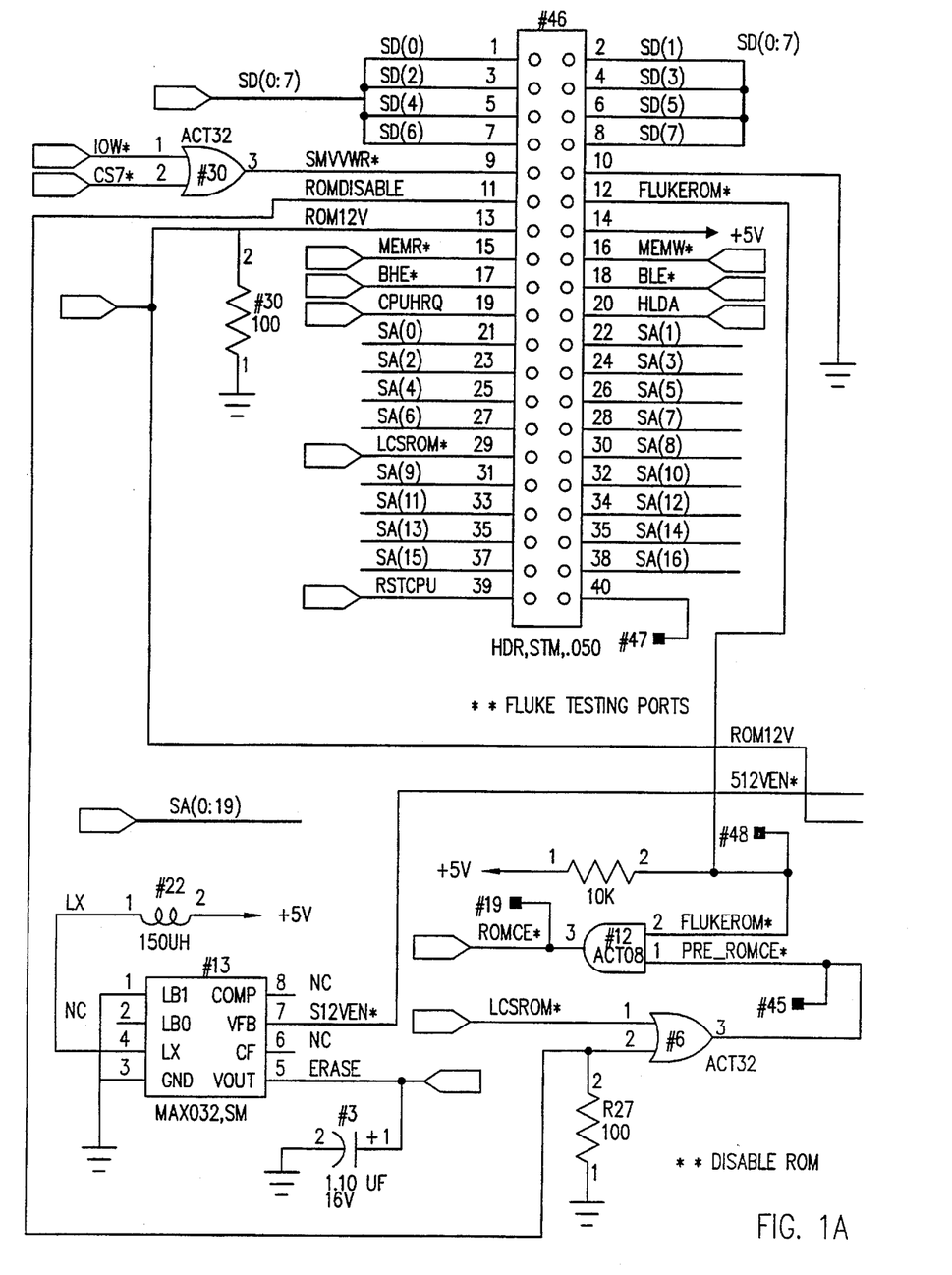
FIGS. 1A and 1B are parts of a single Figure which shows important connections of the innovative test header on the motherboard of the portable computer system of the presently preferred embodiment.
Figure 1B:
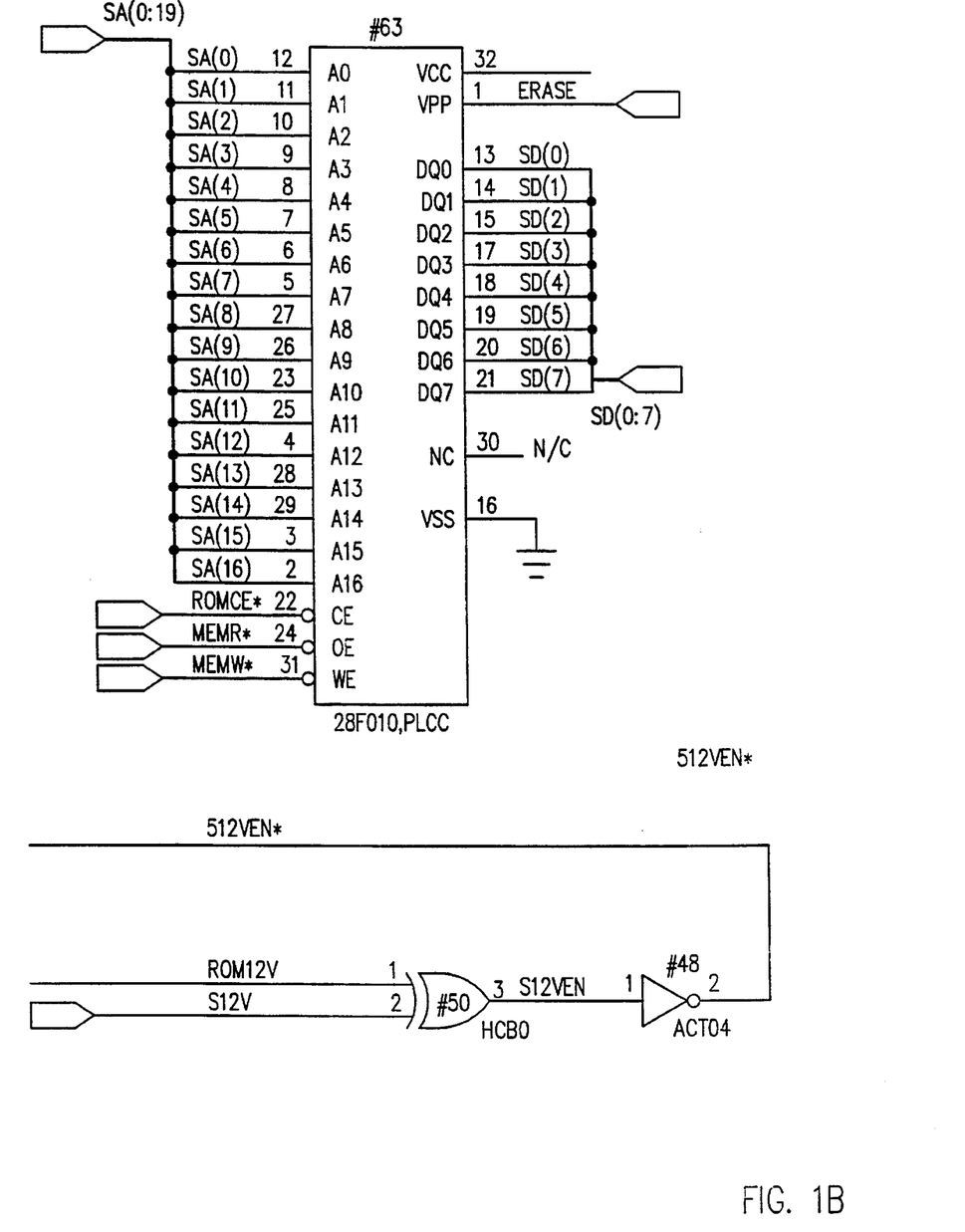

FIGS. 1A and 1B are parts of a single Figure which shows important connections of the innovative special connector (header) on the motherboard of the portable computer system of the presently preferred embodiment. Note that this connector uses only 40 pins, in the presently preferred embodiment. Signals brought out through this connector include several special lines, as well as power, ground, and bus address and data lines SA(0)-SA(16,) and SD(0)-SD(7). Line ROM12V was intended to be a control for programmation of the flash EPROM. This line operates at 5 V, but drives a gate on the motherboard which will connect a 12 V supply to the erase pin of the flash chip. Line 512V is a software output (from the GCS registers) which permits software to actuate erasure of the flash memory.

Line CPUHRQ is the standard processor hold request.
Line RSTCPU is the main reset input into the CPU.
Line SMVUWR is the decoded write for the SmartVu.
Line HLDA is a standard ISA signal.
(Line TP519 is merely a test point.)
Lines MEMR* and MEMW* are standard ISA bus lines.
Lines BLE* and BHE* are standard ISA bus lines (used for bank-select).

Note that line ROMDISABLE is normally held low by 100 Ω resistor R23. However, if the boot card is inserted, line ROMDISABLE is connected to power. Similarly, line FLUKEROM* is normally held high by 10 Ω resistor R61, but can be pulled down by an inserted card.

Line LCSROM* generally corresponds to a normal chip-enable line for the on-motherboard ROM: address decode logic would drive this line when the microprocessor attempts to access an address within the ROM's address space. However, the present invention interposes additional hard-wired logic, to permit the on-board ROM to be bypassed. Signal LCSROM* is ORed with signal ROMDISABLE by gate U24, to produce a signal PRE_ROMCE*. This signal is ANDed with signal FLUKEROM* in gate U43, to produce the actual chip-enable signal ROMCE* which is connected to the on-motherboard ROM.

Boot Card for Test Port

The Apollo Flash Shunt Module is a service tool which is intended to allow a technician to boot up an Apollo unit when the on-board Flash BIOS has been corrupted.

Detailed Use: The following can be performed any time when it would be necessary to temporarily disable the on-board Flash BIOS, such as when a BIOS upgrade process got disturbed and the BIOS was corrupted.

The Flash Module has been designed to plug onto the JFLK connector located under the service bay door on the Apollo notebook. This will logically place the plug-on module in parallel with the on-board Flash BIOS.

To use the Flash Shunt with the Flash.exe program, install the shunt card onto JFLK with jumpers J1 and J2 installed on the "Shunt Flash" position. Booting up the Apollo now will execute the BIOS from the plug-on card. Execute the "Flash" program from the DOS prompt. Let the program run up to the point of being prompted to program on-board Flash.

Change the plug-on jumpers to the MBD FLASH position before you let the program erase the flash. If you do not change the jumpers at this time, the message for not being able to set 12 volts will appear. Let the program finish upgrading the on-board BIOS.

The JSMVU connector is for plugging the Dell Smartvu module onto the Flash Shunt module since the JFLK connector would not be accessible during this operation.

Circuitry of Boot Card

FIGS. 2A-1, 2A-2, and 2A-3 are parts of a single Figure which shows the wiring of the preferred embodiment of the innovative boot-memory-bypass card disclosed herein.

Reprogrammable Nonvolatile Memory on Boot Card

For convenient updating, the memory on the boot card is itself rewritable. However, jumper protection prevents accidental writing of this memory.

Diagnostic Card Circuitry

Figure 2A:
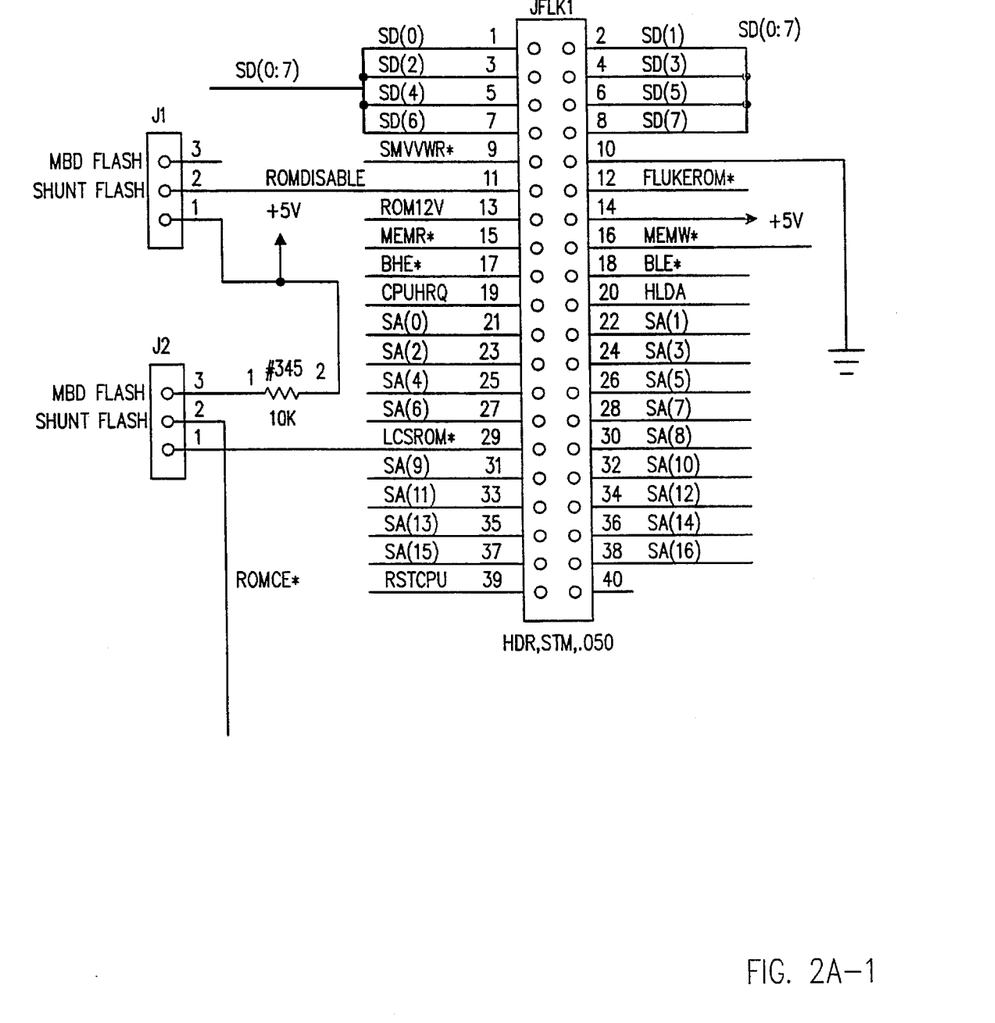
Figure 2A:
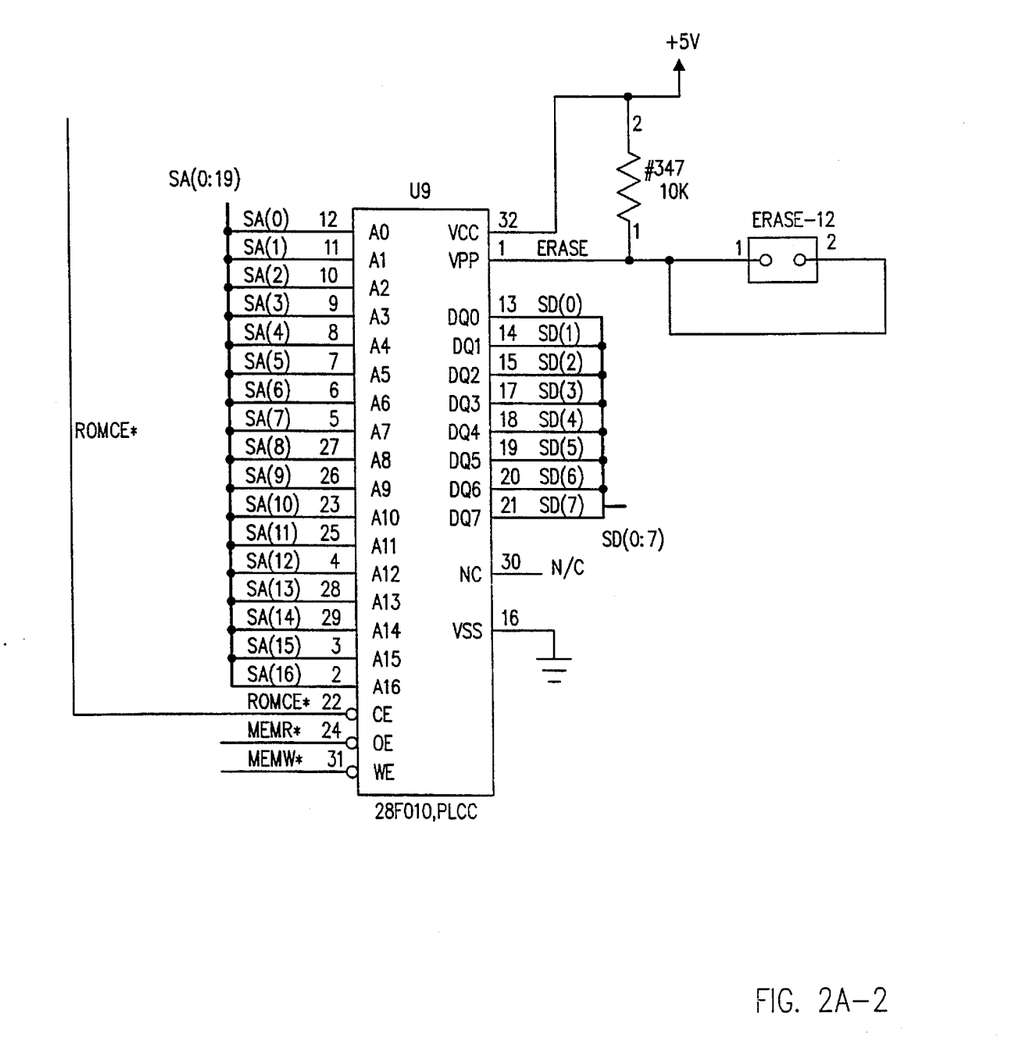
Figure 2A:
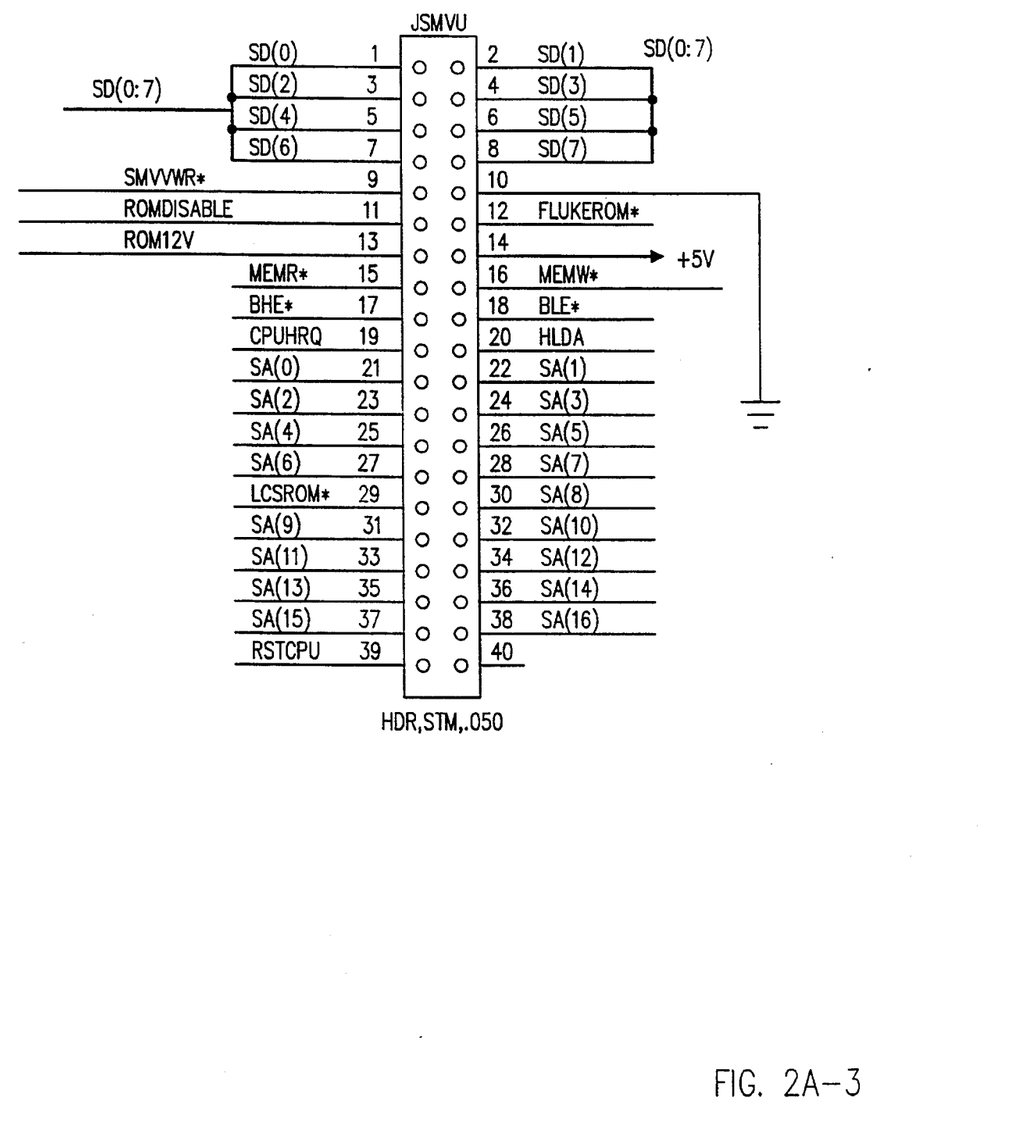
Figure 2B:
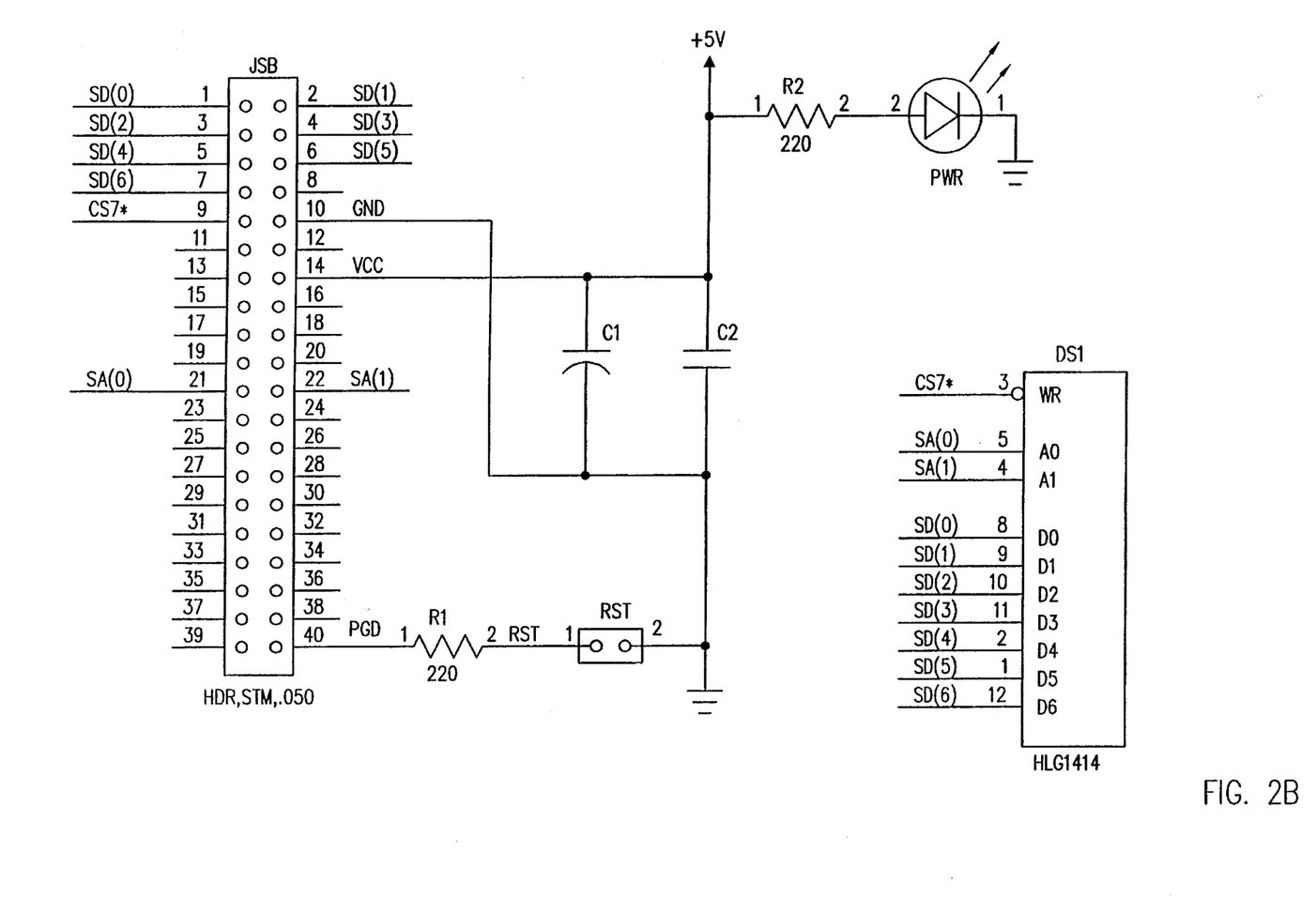
FIG. 2B shows the wiring of the preferred embodiment of the innovative diagnostic-display card disclosed herein.

FIG. 2B shows the wiring of the preferred embodiment of the innovative diagnostic-display card disclosed herein. The display itself is preferably a simple array of four 7-segment LED character displays. Note that a power-on LED is also provided, to show the user when the card is plugged in and receiving power.

Figure 2C:
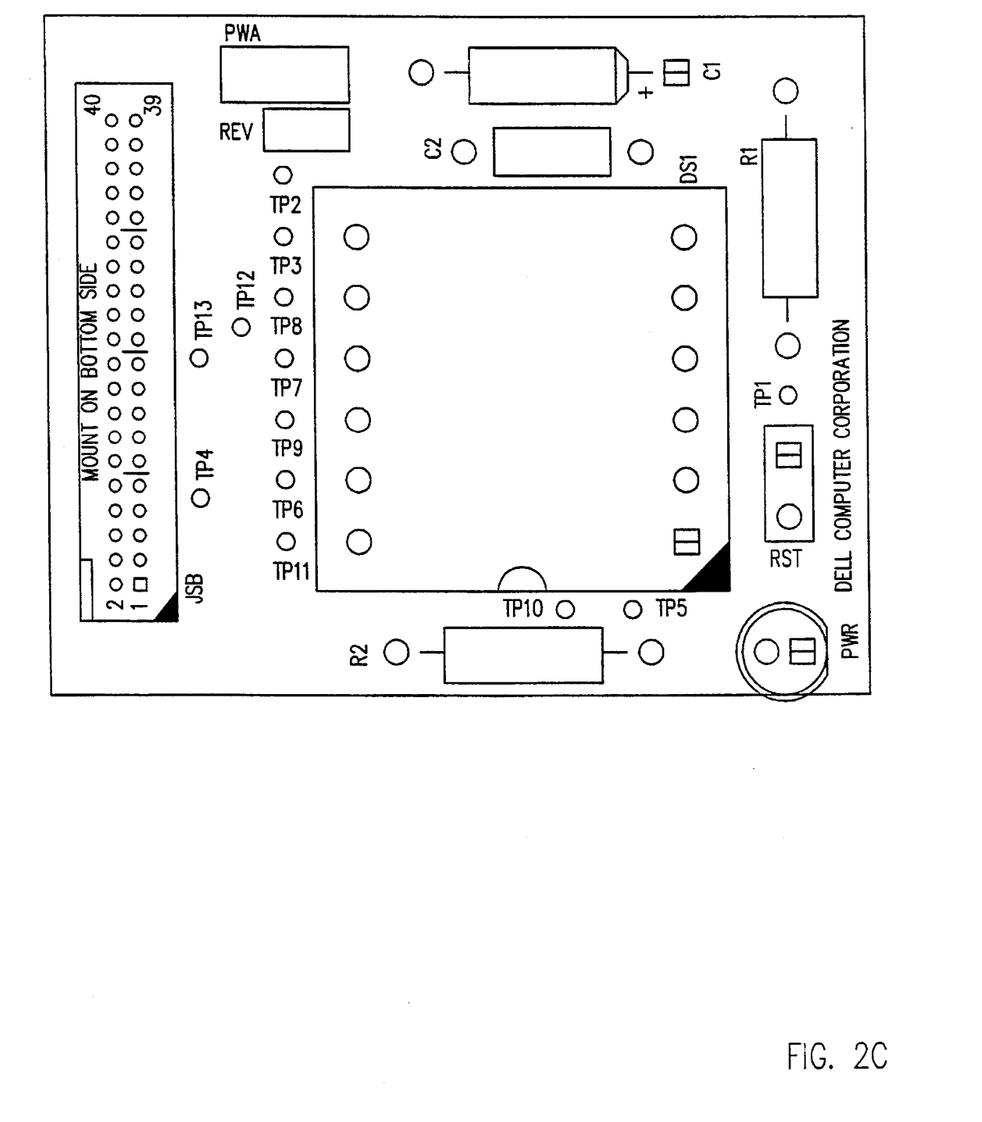
FIG. 2C shows the external appearance of the preferred embodiment of the innovative diagnostic-display card disclosed herein.

FIG. 2C shows the external appearance of the preferred embodiment of the innovative diagnostic-display card disclosed herein. The 4-character LED display is the large module near the center of the card, and the power-on LED is near the bottom right of the Figure orientation shown.

Note that the 82C106 chip has a chip-select line which is used, in the presently preferred embodiment, to enable the SmartVu display.

Stacked Combination with Boot Card

Note that the boot card includes both male and female headers. As the header pin assignments show, all of the signals needed by the diagnostic display card are passed through by the male and female headers on the boot card. Thus the boot card and the diagnostic display card can be stacked together, or either can be used alone.

Further Modifications and Variations

It will be recognized by those skilled in the art that the innovative concepts disclosed in the present application can be applied in a wide variety of contexts. Moreover, the preferred implementation can be modified in a tremendous variety of ways. Accordingly, it should be understood that the modifications and variations suggested below and above are merely illustrative. These examples may help to show some of the scope of the inventive concepts, but these examples do not nearly exhaust the full scope of variations in the disclosed novel concepts.

For example, the special connector's cover does not have to be located in anything like the location shown in FIG. 4. The board organization of the computer does not have to be the same, and the computer need not include a keyboard as primary input device.

The specific signals routed through the special connector also do not have to be the same as those described. In general, it is desirable that a card connected to the special connector should be able: 1) to disable the motherboard boot memory, 2) to tell when the motherboard boot memory is being accessed, and 3) to provide outputs to the CPU (directly or indirectly) which fully replace those which would have been supplied by the disabled motherboard boot memory. Preferably (but not necessarily) all of the motherboard boot memory's control inputs are brought up through the special connector, as are all data lines which can be driven by the motherboard boot memory, and all address lines which are relevant to selection of an address within the motherboard boot memory.

The hardware technique used to permit disabling the motherboard boot memory does not have to be the same as that described. For example, alternatively and less preferably, gates could be used to disable the power supply to the boot memory, or to interrupt its data outputs.

For another example, the special connector does not be any means have to be a pin and socket connection; other electromechanical arrangements, such as pad contacts, can be substituted instead.

For another example, although the preferred sample system embodiment includes a primary system board on which the CPU, main memory, and boot memory are mounted, the disclosed inventions can be applied to other board arrangements as well (including arrangements wherein multiple boards are closely connected together in place of a single primary board).

As will be recognized by those skilled in the art, the innovative concepts described in the present application can be modified and varied over a tremendous range of applications, and accordingly the scope of patented subject matter is not limited by any of the specific exemplary teachings given.

What is claimed is:

1. A portable computer system, comprising:

at least one input device and at least one output device;

a chassis, containing at least one motherboard which carries
  at least one central processing unit (CPU),
  at least one main memory connected to be read/write accessed by said CPU, and
  at least one nonvolatile boot memory having one or more control inputs, a plurality of address inputs, a plurality of data outputs, and connected to be read-accessed by said CPU at an address location such that said CPU will begin execution of programs from said boot memory when emerging from at least some reset conditions;

a plurality of input/output interface connections, each connected to at least one line which is accessible to said CPU; and a special external connector, comprising multiple lines operatively connected to said CPU and to said boot memory, said lines including at least:
  at least one line connected to at least one control input of said nonvolatile memory,
  a plurality of lines connected to address inputs of said nonvolatile memory, and
  a plurality of lines operatively connected to data inputs of said CPU, said special external connector capable of receiving a boot card, said boot card containing alternative programs to be executed by said CPU in lieu of said programs stored in said boot memory, said CPU capable of communicating with said boot card to retrieve and execute said alternative programs.

2. The portable computer system as recited in claim 1 wherein said boot card is capable of writing said alternative programs into said boot memory to replace said programs stored in said boot memory.

3. The portable computer system as recited in claim 1 wherein said boot memory is electrically-eraseable programmable read-only memory (EEPROM).

4. The portable computer system as recited in claim 1 wherein said portable computer is a notebook computer.

5. The portable computer system as recited in claim 1 further comprising a liquid crystal display (LCD) coupled to said CPU.

6. The portable computer system as recited in claim 1 wherein a reset button coupled to said CPU causes said CPU to assume a reset condition.

7. The portable computer system as recited in claim 1 wherein said alternative programs are stored in nonvolatile memory on said boot card.

8. A method of booting a portable computer system, comprising the steps of:
coupling a boot card to said portable computer, said boot card capable of communicating with a central processing unit (CPU) within said portable computer;
resetting said CPU to cause said CPU to boot; and
retrieving and executing, with said CPU, alternative boot programs stored in memory on said boot card, said boot card substituting said alternative boot programs in lieu of boot programs stored in boot memory within said portable computer.

9. The method as recited in claim 8 further comprising the step of writing said alternative boot programs into said boot memory to replace said boot programs stored in said boot memory.

10. The method as recited in claim 8 wherein said boot memory is electrically-eraseable programmable read-only memory (EEPROM).

11. The method as recited in claim 8 wherein said portable computer is a notebook computer.

12. The method as recited in claim 8 further comprising the step of coupling a liquid crystal display (LCD) to said CPU.

13. The method as recited in claim 8 further comprising the step of resetting said CPU with a reset button coupled to said CPU.

14. The method as recited in claim 8 wherein said boot memory is nonvolatile memory.

15. A portable computer, comprising:
a central processing unit (CPU) within said portable computer capable of retrieving boot programs from nonvolatile memory within said portable computer when said CPU is reset to thereby allow said CPU to boot;
an external connector including lines coupled to said CPU and said nonvolatile memory; and
a boot card capable of being coupled to said external connector, said boot card containing alternative boot programs in boot card memory on said boot card, said boot card providing said alternative boot programs to said CPU in lieu of said boot programs stored in said nonvolatile memory to thereby allow said portable computer to boot when said boot programs stored in said nonvolatile memory are corrupt.

16. The portable computer as recited in claim 15 wherein said boot card is capable of writing said alternative boot programs into said boot memory to replace said boot programs stored in said boot memory.

17. The portable computer as recited in claim 15 wherein said boot memory is electrically-eraseable programmable read-only memory (EEPROM).

18. The portable computer as recited in claim 15 wherein said portable computer is a notebook computer.

19. The portable computer as recited in claim 15 further comprising a liquid crystal display (LCD) coupled to said CPU.

20. The portable computer as recited in claim 15 wherein a reset button coupled to said CPU causes said CPU to assume a reset condition.

21. The portable computer as recited in claim 15 wherein said boot card memory is nonvolatile memory.

22. A method of booting a portable computer, comprising the steps of:
resetting a central processing unit (CPU) within said portable computer, said CPU capable of retrieving boot programs from nonvolatile memory within said portable computer when said CPU is reset to thereby allow said CPU to boot;
coupling a boot card to an external connector on said portable computer, said external connector including lines coupled to said CPU and said nonvolatile memory, said boot card containing alternative boot programs in boot card memory on said boot card; and
providing said alternative boot programs to said CPU in lieu of said boot programs stored in said nonvolatile memory to thereby allow said portable computer to boot when said boot programs stored in said nonvolatile memory are corrupt.

23. The method as recited in claim 22 further comprising the step of writing said alternative boot programs into said boot memory to replace said boot programs stored in said boot memory.

24. The method as recited in claim 22 wherein said boot memory is electrically-eraseable programmable read-only memory (EEPROM).

25. The method as recited in claim 22 wherein said portable computer is a notebook computer.

26. The method as recited in claim 22 further comprising the step of coupling a liquid crystal display (LCD) to said CPU.

27. The method as recited in claim 22 further comprising the step of resetting said CPU with a reset button coupled to said CPU.

28. The method as recited in claim 22 wherein said boot card memory is nonvolatile memory.

29. A portable computer system, comprising:
at least one input device and at least one output device; a chassis, containing at least one motherboard which carries:
at least one central processing unit (CPU),
at least one main memory connected to be read/write accessed by said CPU, and
at least one nonvolatile boot memory having one or more control inputs, a plurality of address inputs, a plurality of data outputs, and connected to be read-accessed by said CPU at an address location such that said CPU will begin execution of programs from said boot memory when emerging from at least some reset conditions;
a plurality of input/output interface connections each connected to at least one line which is accessible to said CPU: and a special connector, comprising multiple lines operatively connected to said CPU and to said boot memory, said lines including at least:
  at least one line connected to at least one control input of said nonvolatile memory,
  a plurality of lines connected to address inputs of said nonvolatile memory, and
  a plurality of lines operatively connected to data inputs of said CPU, said special connector capable of receiving a boot card, said boot card containing alternative programs to be executed by said CPU in lieu of said programs stored in said boot memory, wherein said boot card is capable of writing said alternative programs into said boot memory to replace said programs stored in said boot memory.

* * * * *